(12) United States Patent
Baig

(10) Patent No.: US 6,443,256 B1
(45) Date of Patent: Sep. 3, 2002

(54) DUAL LAYER ACOUSTICAL CEILING TILE HAVING AN IMPROVED SOUND ABSORPTION VALUE

(75) Inventor: Mirza A. Baig, Lindenhurst, IL (US)

(73) Assignee: USG Interiors, Inc., Chicago, IL (US)

( * ) Notice: Subject to any disclaimer, the term of this patent is extended or adjusted under 35 U.S.C. 154(b) by 14 days.

(21) Appl. No.: 09/748,989

(22) Filed: Dec. 27, 2000

(51) Int. Cl.$^7$ ................................................. E04B 1/82
(52) U.S. Cl. ...................................... 181/286; 181/290
(58) Field of Search ............................... 181/286, 290, 181/287, 288, 294, 295

(56) References Cited

U.S. PATENT DOCUMENTS

| | | |
|---|---|---|
| 3,082,143 A | 3/1963 | Smith |
| 3,103,254 A | 9/1963 | Stedman |
| 3,283,849 A | 11/1966 | Schirick et al. |
| 3,441,465 A | 4/1969 | Pearson |
| 3,480,104 A | 11/1969 | Austin et al. |
| 3,952,830 A | 4/1976 | Oshida et al. |
| 3,988,199 A | 10/1976 | Hillmer et al. |
| 4,056,161 A | 11/1977 | Allen, Jr. |
| 4,089,740 A | 5/1978 | Hillman |
| 4,111,081 A | 9/1978 | Hilliard et al. |
| 4,283,457 A | 8/1981 | Kolsky et al. |
| 4,847,140 A | 7/1989 | Jaskowski |
| 4,851,274 A | 7/1989 | D'Elia |
| 4,963,603 A | 10/1990 | Felegi, Jr. et al. |
| 5,071,511 A | 12/1991 | Pittman |
| 5,134,179 A | 7/1992 | Felegi, Jr. et al. |
| 5,149,920 A | 9/1992 | Meeker et al. |
| 5,202,174 A | 4/1993 | Capaul |
| 5,250,153 A | 10/1993 | Izard et al. |
| 5,277,762 A | 1/1994 | Felegi, Jr. et al. |
| 5,558,710 A | 9/1996 | Baig |
| 5,665,447 A * | 9/1997 | Greaves et al. ............. 181/284 |
| 5,674,594 A | 10/1997 | Sensenig |
| 5,911,818 A * | 6/1999 | Baig ......................... 106/122 |

* cited by examiner

Primary Examiner—Marlon T. Fletcher
Assistant Examiner—Kim Lockett
(74) Attorney, Agent, or Firm—Robert H. Robinson; John M. Lorenzen; David F. Janci

(57) ABSTRACT

An acoustical ceiling tile having an improved sound absorption value and having a dual layer of acoustical materials. The base mat layer has either no mineral wool or a low mineral wool content. The surface layer has a high mineral wool content which provides improved sound absorption values with or without perforating or fissuring the tile. The dual layer acoustical ceiling tile has a noise reduction coefficient (NRC) value of at least about 0.50.

13 Claims, No Drawings

DUAL LAYER ACOUSTICAL CEILING TILE HAVING AN IMPROVED SOUND ABSORPTION VALUE

FIELD OF THE INVENTION

This invention relates to an acoustical ceiling tile having an improved sound absorption value. More particularly, this invention relates to a dual layer acoustical ceiling tile having a low or no mineral wool base mat layer and a high mineral wool overlay surface layer which provides improved sound absorption values with or without perforating or fissuring the tile. The invention also relates to a dual layer acoustical tile which is manufactured using a high speed, water-felting process. A pattern can be applied before drying the tile (wet end embossing), or the pattern can be formed in the tile after the drying.

BACKGROUND OF THE INVENTION

The water-felting of dilute aqueous dispersions of mineral wool and lightweight aggregate is a commercial process for manufacturing acoustical ceiling tile. In this process, a dispersion of mineral wool, lightweight aggregate, binder and other ingredients as desired or necessary is flowed onto a moving foraminous support wire, such as that of a Fourdrinier or Oliver mat forming machine, for dewatering. The dispersion is first dewatered by gravity and then vacuum suction is applied. After vacuum dewatering, the wet mat is dried in heated convection drying ovens, and the dried mat is cut to the desired panel or tile dimensions. If desired, the panels or tiles can be top coated with paint.

Acoustical ceiling tiles can also be made by a wet pulp molding or cast process such as described in U.S. Pat. No. 1,769,519. In accordance with this process, a molding composition comprising granulated mineral wool fibers, fillers, colorants and a binder (e.g. starch gel), is prepared for molding or casting the tile. The composition is placed upon suitable trays which have been covered with paper or a metallic foil and then the composition is screeded to a desired thickness with a screed bar or roller. A decorative surface, such as elongated fissures, may be provided by the screed bar or roller. The trays filled with the mineral wool composition are then placed in an oven to dry or cure.

In U.S. Pat. No. 5,250,153, issued Oct. 5, 1993, a process is disclosed for making mineral wool panels on a foraminous support wire by forming a dilute aqueous dispersion of mineral wool fibers and/or aggregate and an anionically stabilized latex binder. The binder is deposited onto the mineral wool fibers by adding a small amount of a cationic flocculant. Substantially all of the binder latex becomes coupled to the mineral wool fibers. The wet mat can be dried quickly by passing heated air through the mat that is capable of maintaining its structure.

In my U.S. Pat. No. 5,558,710, issued Sep. 24, 1996, I disclose a gypsum/cellulosic fiber composition that can replace all or a portion of the mineral wool normally present in acoustical ceiling tiles. The gypsum/cellulosic fiber composition is combined with a lightweight aggregate material and a binder to form a composition that is used in a water-felting process to manufacture acoustical ceiling tiles.

As disclosed in Example 1 of U.S. Pat. No. 5,558,710, a water-felting process was used to make the acoustical tiles. The feed slurry during mat formation was held at 4% solids, and this 4% solids consistency was also used in making the control tile. The control tile, using 100% mineral fiber (i.e. no gypsum/wood fiber) had the following formulation:

|  | Weight % |
|---|---|
| Mineral Fiber | 37.58 |
| Expanded Perlite | 34.83 |
| Newspaper | 15.91 |
| CTS-1 Clay | 3.54 |
| Starch | 8.01 |
| Flocculant | 0.06 |
| Surfactant | 0.08 |

Samples of the control tile were tested for NRC (noise reduction coefficient) using the Impedance tube method. The samples were not perforated, fissured or painted. The control tiles had an average NRC value of only 0.434.

In general, acoustical tiles made using a water-felting process have a hard surface that does not have good sound absorption properties. The sound absorption is substantially improved by fissuring and/or perforating the surface that increases the NRC value. However, many purchasers prefer a smooth, unperforated acoustical ceiling tile for its aesthetic appearance.

As disclosed in U.S. Pat. No. 5,250,153, acoustical ceiling tiles having an average NRC equivalent to commercially available cast ceiling tiles can be made by using an anionically stabilized latex binder and a cationic flocculant to couple the latex binder onto the mineral fiber materials. In the acoustical tiles made by this process, the mineral fibers constitute about 50% or more of the total dry solids, preferably from about 60 to about 95 weight % of the acoustical panel. However the tiles made by this process are quite soft compared to the water-felted tiles having a starch binder. In addition, the tiles made with a latex binder have lower structural strength and are made in thicknesses of at least about ½ inch and frequently have a woven scrim applied thereto to increase strength. These acoustical tiles do have smooth surfaces and higher NRC values resulting from the higher mineral wool content.

Mineral wool acoustical tiles are porous which is necessary to provide good sound absorption. The prior art (U.S. Pat. Nos. 3,498,404, 5,013,405 and 5,047,120) also discloses that mineral fillers, such as expanded perlite, may be incorporated into the composition to improve sound absorbing properties.

It is an object of this invention to provide an acoustical tile having a dual layer of acoustical materials both of which contain mineral fibers or having a base mat with no mineral fibers.

It is another object of this invention to provide a water-felted base mat having a relatively low mineral fiber content or no mineral fibers and a surface layer having a high mineral fiber content to form an acoustical tile with improved sound absorbing properties.

It is a further object of this invention to provide a dual layer acoustical ceiling tile having a smooth, unperforated surface and also good sound absorbing properties.

It is a still further object of this invention to provide a dual layer acoustical ceiling tile having a sound absorption value (NRC) of at least about 0.50.

These and other objects will be apparent to persons skilled in the art in view of the description that follows.

SUMMARY OF THE INVENTION

It has been discovered that a dual layer acoustical ceiling tile having an improved sound absorption value (NRC) can be made in a water-felting process wherein a base mat layer has a relatively low mineral fiber content, and a surface layer having a high mineral fiber content is overlaid onto the base mat. The base mat layer is made from a low mineral fiber content or no mineral fiber material which has relatively low NRC values unless its surface is perforated and/or fissured. The mineral fiber-rich surface layer that has a thickness of about ¼ inch or less also has a relatively low NRC value at such thickness. It was discovered that these two low NRC value materials could be combined to provide a dual layer ceiling tile having a high NRC value.

DETAILED DESCRIPTION OF THE INVENTION

The acoustical ceiling tiles of this invention are based on the discovery that two acoustical materials having relatively low NRC values can be combined to form a dual layer acoustical ceiling tile having excellent sound absorption values (NRC). These ceiling tiles are made using a water-felting process to form both the base mat layer and the fiber-rich surface layer. In carrying out the process, two head boxes are used to feed the acoustical materials to the production line.

One head box feeds the base mat material, having a relatively low mineral fiber content (less than about 50% by weight of mineral fiber) or it may contain no mineral fiber, to a moving foraminous support wire, such as that of a Fourdrinier or Oliver mat forming machine for dewatering. After water is removed through the support wire by gravity, additional water can be removed by applying a vacuum to the wet base mat, but depending upon the consistency of the base mat material in the head box, the line speed and other considerations, it may not be necessary to use vacuum for dewatering purposes prior to depositing the fiber-rich overlay material onto the base mat. The base mat material consists essentially of mineral wool fibers, expanded perlite, cellulose fiber, starch binder and gypsum which can be present, preferably, in the following amounts, and having at least about 30% by weight of expanded perlite:

| Ingredient | Weight % |
| --- | --- |
| Mineral Wool Fibers | 5–25 |
| Expanded Perlite | 30–60 |
| Cellulose Fiber | 10–21 |
| Starch Binder | 4–9 |
| Gypsum | 3–30 |

After the initial dewatering of the base mat material on the wire support, the still wet base mat may be passed under a press roller to compress the mat, removing more water and establishing the thickness of the wet base mat. In general, the thickness of the wet base mat just prior to depositing the fiber-rich surface layer may range from about 1 inch to about 2.5 inches. It is preferred that the completely dried base mat have a thickness ranging from about 0.25 inch to about 0.625 inch.

If desired or necessary to strengthen the dual layer ceiling tile, a fiberglass scrim can be placed on the wet base mat prior to depositing the fiber-rich surface layer. The fiberglass scrim can be either woven or non-woven. If a fiberglass scrim is used, it is generally preferred that it be placed between the base mat material and the fiber-rich surface layer, however, if desired, the scrim can be placed on top of the fiber-rich surface layer or in contact with the back of the base mat material, in which case, the base mat slurry from the head box would be deposited on the scrim.

The fiber-rich surface layer consists essentially of mineral wool fibers, gypsum, clay filler, latex binder, starch binder and flocculant to deposit the latex binder on the mineral wool fibers as disclosed in U.S. Pat. No. 5,250,153. These ingredients may be present, preferably, in the following amounts:

| Ingredient | Weight % |
| --- | --- |
| Mineral Wool Fibers | 70–90 |
| Perlite | 0–15 |
| Cellulose Fibers | 3–7.5 |
| Gypsum | 1–15 |
| Clay Filler | 0–12 |
| Latex Binder | 3–9 |
| Starch Binder | 3–9 |
| Flocculant | 0.05–0.1 |

The fiber-rich surface material is prepared in accordance with the method disclosed in U.S. Pat. No. 5,250,153 wherein an anionically stabilized latex binder is deposited on or coupled to the mineral fibers by adding a small amount of a flocculant such as a cationic polyacrylamide to the slurry. In accordance with this invention, the fiber-rich slurry contains a very large amount of mineral wool fibers (at least about 75% by weight) and little or no expanded perlite. The fiber-rich material is deposited on the base mat from a second headbox to form a dual layer material which is dewatered by applying a vacuum to the wet dual layer material and also by passing the wet dual layer material under a press roll. The press roll helps to remove some of the water. The fiber-rich surface is textured and the thickness of the dual layer material is established under the pattern/texture roll. The dual layer material is subsequently passed to an oven to complete the drying process and to cure the starch and latex binders.

When completely dried and cut into ceiling tiles, the dual layer material has a smooth or textured surface that is rich in mineral wool fibers and unperforated. In general, it is preferred that the dried dual layer ceiling tiles have a total thickness ranging from about 0.5 inch to about 1 inch, with the thickness of the fiber-rich surface layer ranging from about 0.125 inch to about 0.5 inch. The thickness of the wool-rich surface layer can be increased from about 0.5 inch to about 0.625 inch to provide higher NRC values.

Prior to drying the dual layer material in an oven, it is preferred to apply a "wet end coating" to the mineral fiber-rich surface, which is smooth and unperforated. One or more coats of paint may be spray applied. It has been found that the application of paint actually increases the NRC value, because the unpainted surface tends to reflect the sound and therefore has a lower NRC (noise reduction coefficient).

Other ingredients may also be present in either the base mat or the fiber-rich surface layer or both layers. Examples of such ingredients include dyes, pigments, inorganic fillers, antioxidants, surfactants, water repellents, fire retardants and the like.

As noted above, gypsum (calcium sulfate dihydrate) is preferably present in both layers. The gypsum is soluble in the aqueous slurry comprising both the base mat and the fiber-rich layer feed material. The solubility of the gypsum in the processing slurry enables the gypsum to function as a flocculant in the slurry formulation. The flocculating function provides uniform distribution of fine particles (e.g. clay, gypsum, perlite and starch) present in the formulation during mixing. This flocculating function helps to prevent the fine and high density particles from migrating to the bottom of the mat. In addition, the gypsum helps to disperse the mineral wool fibers in the aqueous slurry.

A starch binder is also present in both the base mat and the fiber-rich surface layer. It is preferred to use the starch in the form of a gel which is prepared by dispersing starch particles in water and heating the slurry until the starch is fully cooked and the slurry thickens to a viscous gel. If the binder is corn starch, cooking temperatures may range from about 180° F. (82° C.) to about 195° F. (90° C.). It should be noted that starch may also be used as a binder without pre-cooking the starch to form a gel. In addition, the starch can be used in a pre-gelatinized form which is converted to a gel merely by adding it to water, without the need to cook it.

The following specific examples will further illustrate various specific embodiments of the present invention. Unless specified to the contrary, all amounts are expressed as parts by weight on a dry solids total weight basis. Of course, it is to be understood that these examples are by way of illustration only and are not to be construed as limitations on the present invention.

EXAMPLE 1

Samples of commercially available, mineral fiber-rich, acoustical ceiling tiles were used to determine sound absorption properties (NRC values) for thin layer (approximately ¼ inch thick) materials. Such materials do not have sufficient structural strength to be made in a water-felting process in such thin layers, and therefore, ceiling tiles were made having a thickness of about 0.7 inch and a density of about 16 pcf. The tiles had a back coating of 35-C clay at coverage of about 24 grams/ft.$^2$ (dry) which increase the tile density by about 0.85 pcf. The thin layer samples were cut from the back of the tile. Samples 1–4 had the following formulation:

|  | Samples 1 & 2 Weight % | Samples 3 & 4 Weight % |
| --- | --- | --- |
| Mineral Wool Fibers | 88.9 | 91.8 |
| Gypsum | 1.5 | 1.5 |
| Clay Filler | 0 | 0 |
| Latex Binder | 6.6 | 4.7 |
| Starch Binder | 3.0 | 2.0 |
| Flocculant | 0.07 | 0.07 |

Sample 3 did not have the clay back coating. The samples were cut into 12 inch squares for testing. The following NRC (impedance tube) values were recorded:

| Sample | Thickness (inch) | Actual NRC |
| --- | --- | --- |
| 1-a | 0.225 | 0.23 |
| 1-b | 0.225 | 0.23 |
| 2-a | 0.25 | 0.33 |
| 2-b | 0.25 | 0.33 |
| 3-a | 0.25 | 0.21 |
| 3-b | 0.25 | 0.23 |
| 4-a | 0.25 | 0.32 |
| 4-b | 0.25 | 0.30 |

This data demonstrates that the fiber-rich material in thicknesses of about ¼ inch had very low NRC values.

EXAMPLE 2

The purpose of this trial was to determine the effect of different amounts of latex binder in the fiber-rich overlay formulation, particularly its effect on the dry mat surface hardness. The base mat had the following formulation:

|  | Weight % |
| --- | --- |
| Mineral Wool Fibers | 36.6 |
| Starch Gel Binder (pre-cooked) | 6 |
| Clay (CTS-2) | 5 |
| Paper Fibers | 14 |
| Perlite | 38.4 |

A standard water-felting process was used to make the base mat, with the stock material having a consistency of about 5.8% by weight of solids. The line speed was about 30 feet/minute. The dried base mat had a thickness of about 0.5 inch.

The fiber-rich overlay material had the following formulation:

|  | Weight % | |
| --- | --- | --- |
|  | A | B |
| Mineral Wool Fibers | 86.4 | 86.4 |
| Starch Gel Binder (pre-cooked) | 6 | 3 |
| Latex (Dow XU31518.00) | 3 | 6 |
| Clay (CTS-2) | 2.3 | 2.3 |
| Gypsum | 2.3 | 2.3 |
| Flocculant | 0.07 | 0.07 |

The mineral wool, starch, latex binder, clay and gypsum combined had a total weight of 173.6 lbs. and were added to 500 gallons of water, providing a stock consistency of about 4% by weight of solids. The flocculant was subsequently added after thorough mixing of the stock to deposit the latex binder on the mineral fibers. The stock was fed through a 4 foot wide head box at a rate of about 125 gallons/minute.

The NRC values were determined using the Impedance tube method as follows:

| Overlay Formulation | Total Thickness (inch) | Density (pcf) | NRC |
| --- | --- | --- | --- |
| A | 0.731 | 163 | 0.53 |
| B | 0.725 | 16.5 | 0.51 |

The surface of the dried tiles (both formulations) was hard.

EXAMPLE 3

In this trial, the use of paper fiber in the fiber-rich overlay formulation was evaluated. The base mat used the same formulation as in Example 2 and also the same standard water-felting process.

The fiber-rich overlay material had the following formulation:

|  | Weight % | |
|---|---|---|
|  | A | B |
| Mineral Wool Fiber | 82.6 | 85 |
| Starch Gel Binder (pre-cooked) | 2.9 | 6 |
| Latex Binder (Dow, XU31518.00) | 3.9 | 0 |
| Clay (CTS-2) | 3.9 | 2 |
| Gypsum | 1.9 | 2 |
| Paper Fiber | 4.8 | 5 |
| Flocculant | 0.07 | 0 |

In trial A, a wet end coating was applied on the production line before drying. A standard coating (18% solids) was applied, with coverage on the dry tile amounting to 10 gm/ft.$^2$.

The NRC values were determined using the Impedance tube method as follows:

| Overlay Formulation | Total Thickness (inch) | Density (pcf) | NRC |
|---|---|---|---|
| A | 0.676 | 19.6 | 0.54 |
| B | 0.683 | 17.8 | 0.52 |

The use of paper fiber in the overlay formulation improved the surface smoothness, the wet end texturability and the wet strength without adversely affecting the NRC values.

EXAMPLE 4

This trial evaluated the use of larger amounts of gypsum in the overlay formulation. The base mat used the same formulation as in Example 2 and also the same standard water-felting process.

The fiber-rich overlay material had the following formulation:

|  | Weight % | |
|---|---|---|
|  | A | B |
| Mineral Wool Fiber | 83.1 | 83.1 |
| Starch Gel Binder (pre-cooked) | 2.9 | 2.9 |
| Latex Binder (Dow XU31518.00) | 2.9 | 2.9 |
| Gypsum | 11.1 | 11.1 |
| Flocculant | 0.07 | 0.07 |

In both trials, a wet end coating (18% solids) was applied on the production line. The coating coverage amounted to 10 gm./ft.$^2$ on the dry tile. In Trial B, a spray coating (55% solids) was applied to the dry tile, with coverage amounting to 8.5 gm./ft.$^2$.

The NRC values were determined using the Impedance tube method as follows:

| Trial | Total Thickness (inch) | Density (pcf) | NRC |
|---|---|---|---|
| A | 0.690 | 18.0 | 0.56 |
| B | 0.710 | 18.2 | 0.51 |

The increased use of gypsum in the overlay formulation increased the surface hardness and smoothness.

EXAMPLE 5

Trials were performed to evaluate a variety of tile finishing procedures. The base mat used the same formulation as in Example 2 and also the same standard water-felting process.

The fiber-rich overlay material had the following formulation:

|  | Amount (Weight %) |
|---|---|
| Mineral Wool Fibers | 80.9 |
| Starch Gel Binder (pre-cooked) | 2.8 |
| Latex Binder (Dow XU31518.00) | 3.9 |
| Clay (CTS-2) | 2.7 |
| Gypsum | 9.7 |
| Flocculant | 0.07 |

A pair of samples were evaluated in each test. In test 1, the samples were spray painted once. In test 2, the samples were spray painted twice, and in test 3, they were spray painted three times.

The NRC values were determined using the Impedance tube method as follows:

| Test | Total Thickness (inch) | Density (pcf) | NRC |
|---|---|---|---|
| 1 | 0.724 | 15.62 | 0.55 |
| 1 | 0.729 | 15.55 | 0.58 |
| 2 | 0.731 | 16.24 | 0.63 |
| 2 | 0.729 | 16.01 | 0.60 |
| 3 | 0.737 | 16.57 | 0.63 |
| 3 | 0.741 | 16.46 | 0.65 |

It is believed that the improved NRC values in these tests resulted from the lower density tiles compared to previous tests. It is generally preferred that the density of the dual layer ceiling tiles range from about 12 pcf to about 21 pcf.

EXAMPLE 6

Trials were performed to compare estimated (Impedance Tube) NRC values for the dual layer ceiling tiles of this invention with full-scale NRC tests. The base mat and overlay formulations were as follows:

| Ingredients | Base Mat (% by wt) | Overlay (% by wt) |
|---|---|---|
| Mineral Wool | 36.6 | 86 |
| Expanded Perlite | 39.4 | 0 |
| Paper Fiber | 19 | 0 |
| Starch Binder | 5 | 3 |

-continued

| Ingredients | Base Mat (% by wt) | Overlay (% by wt) |
| --- | --- | --- |
| Latex Binder | 0 | 4 |
| Gypsum | 0 | 7 |
| Flocculant | 0 | 0.07 |

Three samples were prepared and tested for NRC values.

| Test | Overlay Caliper (inches) | Total Tile Caliper (inches) | Total Tile Density (pcf) | Estimated (Imp. Tube) NRC Value |
| --- | --- | --- | --- | --- |
| 1 | 0.274 | 0.693 | 17 | 0.58 |
| 2 | 0.262 | 0.622 | 17.2 | 0.62 |
| 3 | 0.250 | 0.7525 | 16.1 | 0.54 |

| Test | Overlay Caliper (inches) | Total Tile Caliper (inches) | Total Tile Density (pcf) | Full-Scale NRC Value |
| --- | --- | --- | --- | --- |
| 1 | 0.274 | 0.725 | 15.8 | 0.61 |
| 2 | 0.262 | 0.675 | 16.3 | 0.56 |
| 3 | 0.250 | 0.725 | 15.8 | 0.61 |

EXAMPLE 7

Two different overlay formulations were tested for their full-scale NRC values. The base mat formulation was the same as reported in Example 6. The overlay formulations were as follows:

| Ingredients | Formulation B (% by wt) | Formulation C (% by wt) |
| --- | --- | --- |
| Mineral Wool | 83.1 | 86.4 |
| Starch Binder | 2.9 | 3 |
| Latex Binder | 2.9 | 6 |
| Gypsum | 11.1 | 2.3 |
| Clay | 0 | 2.3 |
| Flocculant | 0.07 | 0.07 |

The full-scale NRC values were as follows:

| Formulation | Total Tile Caliper (inches) | Total Tile Density (pcf) | Full-Scale NRC Value |
| --- | --- | --- | --- |
| B | 0.725 | 16.9 | 0.50 |
| C | 0.725 | 16.5 | 0.51 |

EXAMPLE 8

Dual layer ceiling tiles were made including the application of a glass fiber scrim onto the mineral wool rich surface. The base mat formulation was the same as the formulation used in Example 6. The mineral wool rich overlay was approximately 0.25 inches in thickness and contained 86% by weight of mineral wool.

The mineral wool rich overlay surface was not ground and was not perforated. However, a standard, non-woven glass fiber scrim was applied to the mineral wool rich overlay surface using an adhesive. The adhesive was Super 77 multipurpose spray adhesive made by 3M Company. The adhesive coverage was approximately 1.5 gm/ft.$^2$.

The dual layer tiles were spray painted (single application) on the mineral wool rich surface with a standard acoustical tile paint. The paint coverage was approximately 27 gm/ft.$^2$. The tiles were tested for estimated (Impedance Tube) NRC values.

| Test | Thickness (inch) | Density (pcf) | E-NRC |
| --- | --- | --- | --- |
| 1-a | 0.627 | 16.5 | 0.53 |
| 1-b | 0.627 | 16.5 | 0.54 |
| 2-a | 0.770 | 15.6 | 0.68 |
| 2-b | 0.770 | 15.6 | 0.66 |

EXAMPLE 9

Dual layer ceiling tiles having a calcium carbonate surface coating were evaluated for estimated NRC value. The dual layer tiles were not perforated. The base mat formulation was the same as the formulation used in Example 6. The mineral wool rich overlay was approximately 0.25 inches in thickness and contained 86% by weight of mineral wool.

The mineral wool rich surface was coated with dry calcium carbonate particles. The coarse calcium carbonate was spray coated at a coverage of about 38 gm./ft.$^2$. Prior to applying the calcium carbonate, the tiles were painted with standard acoustical tile paint. The paint was applied with a roll coat and then with a flow coat and dried. After applying the calcium carbonate, the tiles were spray painted with a standard acoustical tile paint and were dried.

This dual layer ceiling tile with the calcium carbonate coating had an estimated NRC of 0.50.

What is claimed is:

1. A dual layer acoustical ceiling tile made in a water-felting process having an improved sound absorption value (NRC) comprising a low mineral fiber content base mat containing less than about 50% by weight of mineral fiber and having a thickness ranging from about 0.25 inch to about 0.625 inch and a mineral wool fiber-rich overlay surface layer containing at least about 75% by weight of mineral wool fibers and having a thickness ranging from about 0.125 inch to about 0.5 inch, said ceiling tile having a noise reduction coefficient (NRC) value of at least about 0.50.

2. The ceiling tile of claim 1 wherein the fiber-rich surface layer contains both a starch binder and a latex binder.

3. The ceiling tile of claim 2 wherein said mineral fiber-rich surface layer has a thickness of about ¼ inch or less.

4. The ceiling tile of claim 2 wherein there is a fiberglass scrim between the base mat material and the fiber-rich surface layer.

5. The ceiling tile of claim 2 wherein the latex binder in the fiber-rich surface layer has been deposited on the mineral fibers by adding a small amount of flocculent to an aqueous slurry containing the mineral fibers and the latex binder.

6. The ceiling tile of claim 2 wherein both the low mineral fiber base mat material and the fiber-rich surface layer contain a starch gel binder which has been pre-cooked before incorporating it into the base mat material and the fiber-rich surface layer material.

7. The ceiling tile of claim 2 wherein the ceiling tile has a total thickness ranging from about 0.375 inch to about 1 inch.

8. The ceiling tile of claim 2 wherein the fiber-rich surface layer contains cellulose fibers ranging from about 3 to about 7.5 weight percent.

9. The ceiling tile of claim 2 wherein both layers of the tile contain a starch gel binder in the form of a pre-gelatinized starch which is converted to a gel merely by adding it to water.

10. The ceiling tile of claim 2 wherein the ceiling tile has a base mat material and a fiber-rich surface layer which both contain paper fibers.

11. The ceiling tile of claim 2 wherein the density of the tile ranges from about 12 pcf to about 21 pcf.

12. The ceiling tile of claim 2 wherein there is a fiberglass scrim applied to the surface of the fiber-rich layer.

13. The ceiling tile of claim 2 wherein there is a calcium carbonate coating on the surface of the fiber-rich layer.

* * * * *